(12) United States Patent
Van Der Velde et al.

(10) Patent No.: US 9,736,745 B2
(45) Date of Patent: Aug. 15, 2017

(54) NETWORK INTERWORKING

(71) Applicant: Samsung Electronics Co., Ltd., Suwon-si, Gyeonggi-do (KR)

(72) Inventors: Himke Van Der Velde, Zwolle (NL); Gert-Jan Van Lieshout, Apeldoorn (NL); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/227,494

(22) Filed: Mar. 27, 2014

(65) Prior Publication Data

US 2014/0295843 A1 Oct. 2, 2014

(30) Foreign Application Priority Data

Mar. 27, 2013 (GB) .................................. 1305602.3

(51) Int. Cl.
*H04W 36/00* (2009.01)
*H04W 36/22* (2009.01)
*H04W 84/12* (2009.01)

(52) U.S. Cl.
CPC ............ *H04W 36/22* (2013.01); *H04W 84/12* (2013.01)

(58) Field of Classification Search
None
See application file for complete search history.

(56) References Cited

U.S. PATENT DOCUMENTS

| 2003/0153317 | A1 | 8/2003 | Friman et al. |
| 2010/0075682 | A1 | 3/2010 | Del Rio-Romero et al. |
| 2010/0323698 | A1* | 12/2010 | Rune ..................... H04W 48/06 455/436 |
| 2011/0009126 | A1* | 1/2011 | Lee ........................ H04W 28/08 455/453 |
| 2011/0182249 | A1 | 7/2011 | Yang et al. |
| 2011/0317571 | A1 | 12/2011 | Kokkinen et al. |
| 2011/0320588 | A1 | 12/2011 | Raleigh |
| 2012/0307736 | A1 | 12/2012 | Tang et al. |
| 2013/0039340 | A1 | 2/2013 | Lappetelainen et al. |
| 2014/0003239 | A1* | 1/2014 | Etemad ................. H04W 28/08 370/235 |
| 2014/0133294 | A1* | 5/2014 | Horn ................. H04W 28/0247 370/230 |

(Continued)

FOREIGN PATENT DOCUMENTS

| WO | 01/76273 A2 | 10/2001 |
| WO | 2011/098659 A1 | 8/2011 |

*Primary Examiner* — German J Viana Di Prisco
(74) *Attorney, Agent, or Firm* — Jefferson IP Law, LLP

(57) ABSTRACT

A method of operating a mobile terminal for network interworking is provided. The method includes receiving at the mobile terminal a first parameter from a first wireless communication network indicating a preference for offloading a new or current data flow to another network, the first parameter comprising a value within a first range. The method further comprises obtaining at the mobile terminal a random or pseudorandom value within a second range that at least partially overlaps the first range. The method further comprises determining whether to initiate or maintain at least one data flow between the mobile terminal and the first network or another network according to the first parameter and the random or pseudorandom value.

14 Claims, 6 Drawing Sheets

(56) References Cited

U.S. PATENT DOCUMENTS

| | | | | |
|---|---|---|---|---|
| 2014/0133298 A1* | 5/2014 | Han | ............... | H04W 28/0289 370/230 |
| 2014/0219253 A1* | 8/2014 | Henttonen | ............ | H04W 36/30 370/332 |
| 2014/0254576 A1* | 9/2014 | Varma | ............... | H04W 28/08 370/338 |

* cited by examiner

NETWORK INTERWORKING

CROSS-REFERENCE TO RELATED APPLICATION(S)

This application claims the benefit under 35 U.S.C. §119(a) of a United Kingdom patent application filed on Mar. 27, 2013 at the United Kingdom Intellectual Property Office and assigned serial number GB1305602.3, the entire disclosure of which is hereby incorporated by reference.

TECHNICAL FIELD

The present disclosure relates to network interworking. More particularly, the present disclosure relates to interworking between first and second wireless communication networks.

BACKGROUND

Wireless or mobile communication networks (also referred to as cellular networks) in which a User Equipment (UE) (such as a mobile handset) communicates via a radio link to a network of base stations (e.g., eNBs) or other wireless access points connected to a telecommunications network, have undergone rapid development through a number of generations. The initial deployment of systems using analog signaling has been superseded by second Generation (2G) digital systems such as Global System for Mobile communications (GSM), which typically use a radio access technology known as GSM Enhanced Data rates for GSM Evolution Radio Access (GERA), combined with an improved core network.

Second generation systems have themselves been replaced by or augmented by third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by the 3rd Generation Partnership Project (3GPP). Third generation standards provide for a greater throughput of data than is provided by second generation systems. This trend is continued with the move towards fourth Generation (4G) systems.

The 3GPP designs, specifies and standardizes technologies for mobile (cellular) wireless communications networks. Specifically the 3GPP produces a series of Technical Reports (TR) and Technical Specifications (TS) that define 3GPP technologies. The focus of the 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and Long Term Evolution (LTE) concerning the air interface. The first set of EPS specifications were released as 3GPP Release 8 in December 2008. LTE uses an improved radio access technology known as Evolved-UTRAN (E-UTRAN), which offers potentially greater capacity and additional features compared with previous standards. SAE provides an improved core network technology referred to as the Evolved Packet Core (EPC), and in particular provides access to the Internet or proprietary networks. Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of the UMTS and shares certain high level components and protocols with UMTS. LTE Advanced offers still higher data rates compared to LTE and is defined by 3GPP standards starting with Release 10. LTE Advanced is considered to be a 4G mobile communication system by the International Telecommunication Union (ITU). It will be appreciated, however, that the present disclosure is not limited to 3GPP networks, and is specifically not limited to LTE networks. The skilled person will appreciate that the present disclosure could be applicable to interworking between any cellular network and another network.

Wireless Local Area Networks (WLANs) operate to connect two or more devices through a wireless bearer. There are many commercially deployed WLANs providing a connection through an Access Point (AP) to the Internet or a proprietary network. The majority of commercially deployed WLANs are compliant with Institute of Electrical and Electronic Engineers (IEEE) 802.11 standards, also referred to as Wi-Fi. It will be appreciated, however, that the present disclosure is not limited to Wi-Fi networks. WLANs were originally primarily used to provide wireless access to the data networks for laptops and other portable computing devices. More recently, it has become common for mobile terminals designed to operate in cellular networks to also be able to access WLANs. This provides advantages by allowing users access to higher data rates afforded by WLANs, and often lower pricing by network operators, when downloading large volumes of data.

FIG. 1 schematically illustrates a system architecture suitable for interworking between a 3GPP compliant network and a WLAN network according to the related art.

Referring to FIG. 1, an overview of a network architecture for interworking between an LTE network and a WLAN of the related art is provided. It will be appreciated that FIG. 1 is a simplification and a typical implementation of LTE will include further components. The LTE system comprises three high level components: at least one UE 102, the E-UTRAN 104 and the EPC 106. The EPC 106 communicates with Packet Data Networks (PDNs) 108 outside of the LTE network identified in FIG. 1 as being the Internet. FIG. 1 shows certain of the key component parts of the EPC 106. In FIG. 1, interfaces between different parts of the LTE system are shown by lines connecting the components. The double ended arrow labelled LTE indicates the air interface between the UE 102 and the E-UTRAN 104.

The E-UTRAN 104 comprises a single type of component: an eNB which is responsible for handling radio communications between the UE 102 and the EPC 106 across the air interface. An eNB controls UEs 102 in one or more cell, and so LTE may be considered to be a cellular network in which the eNBs provide coverage over one or more cells. Typically, there is a plurality of eNBs within an LTE system.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more PDNs in the outside world, referred to in FIG. 1 simply as the Internet 108. A Mobility Management Entity (MME) 114 controls the high-level operation of the UE 102 through signaling messages exchanged with the UE 102 through the E-UTRAN 104. Each UE is registered with a single MME.

There is no direct signaling pathway between the MME 114 and the UE 102 (communication with the UE 102 being across the air interface via the E-UTRAN 104). Signaling messages between the MME 114 and the UE 102 comprise EPS Session Management (ESM) protocol messages controlling the flow of data from the UE to outside networks and EPS Mobility Management (EMM) protocol messages controlling the rerouting of signaling and data flows when the UE 102 moves between eNBs within the E-UTRAN. The MME 114 exchanges signaling traffic with the S-GW 110 to assist with routing data traffic.

The EPC 106 also includes an Access Network Discovery and Selection Function (ANDSF) server 116. The ANDSF server 116 serves to assist UEs to discover non-3GPP networks, including WLANs such as Wi-Fi or Worldwide Interoperability for Microwave Access (WIMAX). The operation of an ANDSF server is defined in 3GPP TS 23.402 V11.5.0: Architecture enhancements for non-3GPP accesses. The ANDSF server 116 also provides the UE with rules or policies for accessing non-3GPP networks, as mandated by network operators. An ANDSF server 116 may be configured to enable Inter-System Mobility Policy (ISMP) or Inter-System Routing Policy (ISRP). Under ISMP a UE may only have one active access network connection (for example, LTE or Wi-Fi) at any one time. Under ISRP a UE may have more than one active access network connection (for example, both LTE and Wi-Fi) at any one time. Under ISRP a UE may employ IP Flow Mobility (IFOM), Multiple-Access PDN Connectivity (MAPCON) or non-seamless Wi-Fi offload according to operator policy and user preferences. The ANDSF server 116 also provides discovery information, specifically a list of networks that may be available in the vicinity of the UE and information assisting the UE to expedite the connection to these networks.

FIG. 1 also shows a WLAN comprising an AP 118 which provides a connection to a PDN, referred to in FIG. 1 as the AP 118 being connected to the Internet 108. The air interface between the UE 102 and the AP 118 is identified by the double ended arrow labelled Wi-Fi. For interworking between 3GPP networks and WLANs it is desirable that the interworking operates irrespective of whether there is any direct interface between the 3GPP network and the WLAN.

Offloading data traffic to a WLAN is desirable for both the operator and the subscriber as noted above for reasons of improved data rates and reduced demand on 3GPP networks. However, if handled inappropriately the result may a reduction in performance, for instance if a UE offloads data traffic to an already overloaded WLAN. It is known to base network selection decisions on WLAN and 3GPP signal strength without taking into account the current network load. However, the WLAN signal strength may be unrelated to the WLAN network load. Alternatively, a UE may not connect to a WLAN due to relatively low WLAN signal strength despite overloading on the 3GPP network. The result is inefficient usage of the total capacity of a combined 3GPP network and WLAN.

Further problems occur for some UEs which disable 3GPP data access when connected to a WLAN. Furthermore, users frequently disable WLAN connectivity to preserve battery life (which is reduced by scanning for available WLANs). Reduced battery life may be partially mitigated by the network providing information about locally available WLAN access points though this does increase 3GPP network traffic.

System interworking between WLAN and 3GPP has been available since 3GPP Release-6 and is defined in TS 23.234 "3GPP system to Wireless Local Area Network (WLAN)".

TS 23.234 defined loose coupling between the UMTS Core Network (CN) and WLAN networks including common SIM-based authentication mechanisms and access to operator services via a Packet Data Gateway (PDG). This was further enhanced in TS 23.327 "Mobility between 3GPP-Wireless Local Area Network (WLAN) interworking and 3GPP systems" in 3GPP Release-8, which defined seamless mobility between the two networks based on DSMIPv6.

WLAN Interworking with the EPC is defined in TS 23.402 "Architecture enhancements for non-3GPP accesses". The simplest interworking option supported by EPC is non-seamless WLAN offload, in which case the UE connects to WLAN access network when it is available in parallel with 3G/LTE connection. UE data traffic is not routed through the operator's core network and there is no service continuity when the UE moves out of WLAN coverage.

Seamless mobility in which an IP address is preserved during offloading ensures that there is no service interruption when the UE moves between the LTE network and a WLAN. WLAN interworking has been enhanced since Release-10 to support simultaneous connections to 3GPP networks and WLANs. For instance, the UE may connect to a 3GPP operator's services via the 3GPP network and to the Internet via WLAN.

However, a reduction in user experience may occur during cellular network and WLAN interworking if a large number of UEs switch networks. Accordingly, there is a need to provide mechanisms for controlling the offloading of data flows between cellular networks and WLANs that balances network load requirements for both networks, provides proper means for controlling the amount of traffic that is offloaded, and minimizes the risk of small changes in load for one or other network resulting in unintended switching of many data flows.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide improvements allowing interworking between a first wireless communication network and another network.

Another aspect of the present disclosure is to provide offloading of data traffic from cellular networks complying with 3rd Generation Partnership Project (3GPP) Release 12 and beyond of the Evolved-Universal Terrestrial Radio Access (E-UTRA). However, the present disclosure is not limited to this and may be applied to other radio access systems, which will be well known to the skilled person. Certain embodiments of the present disclosure affect the User Equipment (UE) procedures and the information exchanged between the UE and the Evolved-Universal Terrestrial Radio Access Network (E-UTRAN), all of which is specified in 3GPP TS 36.331, E-UTRA, Radio Resource Control (RRC), Protocol specification.

Another aspect of the present disclosure is to provide offloading data traffic from Wireless Local Area Networks (WLANs) complying with Institute of Electrical and Electronic Engineers (IEEE) 802.11 series specifications. However, the present disclosure is not limited to this and may be applied to other types of wireless networks, which will be well known to the skilled person.

Advantageously, certain embodiments of the present disclosure reduce the probability that a small change in load in one or other of the networks causes a large volume of data traffic to be transferred. Advantageously, certain embodiments address offloading of Internet Protocol (IP) flows from a cellular network to another network using a policy that takes a preference of the cellular network to offload data traffic into account. Optionally, the network load of the other network may be taken into account In accordance with an aspect of the present disclosure, a method of operating a mobile terminal for network interworking is provided. The method includes receiving at the mobile terminal a first parameter from a first wireless communication network indicating a preference for offloading a new or current data flow to another network, the first parameter comprising a value within a first range, obtaining at the mobile terminal a random or pseudorandom value within a second range that at least partially overlaps the first range, and determining whether to initiate or maintain at least one data flow between the mobile terminal and the first network or another network according to the first parameter and the random or pseudorandom value.

The determination of whether to initiate or maintain at least one data flow may include evaluating a first criterion by comparing the random or pseudorandom number or a function of the random or pseudorandom number to the first parameter or a function of the first parameter.

The method may further include receiving at the mobile terminal at least one second parameter comprising a scaling factor or an offset, and applying the at least one second parameter to the random or pseudorandom number to calculate the function of the random or pseudorandom number, or applying the at least one second parameter to the first parameter to calculate the function of the first parameter.

The method may further include receiving multiple second parameters at the mobile terminal and determining which second parameter to use to calculate the function of the random or pseudorandom number or the first parameter according to a classification of at least one data flow to be initiated or maintained.

Evaluating the first criterion may include determining whether the random or pseudorandom number or the function of the random or pseudorandom number is less than the first parameter or the function of the first parameter, the random or pseudorandom number or the function of the random or pseudorandom number is less than or equal to the first parameter or the function of the first parameter, the random or pseudorandom number or the function of the random or pseudorandom number is greater than the first parameter or the function of the first parameter, or the random or pseudorandom number or the function of the random or pseudorandom number is greater than or equal to the first parameter or the function of the first parameter.

The method may further include receiving at a mobile terminal a third parameter from a second wireless communication network indicating a network load level of the second wireless communication network, wherein the determination of whether to initiate or maintain at least one data flow further includes evaluating a second criterion by comparing the third parameter or a function of the third parameter to a threshold or a function of the threshold, and determining whether to initiate or maintain at least one data flow between the mobile terminal and the first network or the second network according to the evaluation of the first and second criteria. The threshold may be received from the first network. In certain embodiments where the first network includes a 3GPP compliant cellular network and the second network includes a WLAN, the threshold may be received from an Access Network Discovery and Selection Function (ANDSF) server as part of a WLAN offloading policy.

The determination of whether to initiate or maintain at least one data flow may include performing a determination of whether to initiate a new data flow when it is determined that a new data flow is required, performing a determination whether to initiate or maintain at least one data flow in response to receiving a notification from the first network, or performing the determination of whether to initiate or maintain at least one data flow periodically.

Performing a determination of whether to initiate or maintain at least one data flow in response to receiving a notification from the first network or periodically may include receiving an offload direction indicator from the first network indicating either the first network or another network, identifying at least one data flow between the UE and the indicated first network or another network, and performing the determination of whether to initiate or maintain at least one data flow for the at least one identified data flow.

Performing the determination to initiate or maintain at least one data flow in response to receiving a notification from the first network may further include applying a randomly selected first delay before performing the determination. In certain embodiments the delay is applied before the mobile terminal initiates moving a data flow to a new network (or at least before sending any signaling associated with the move, which may be detected outside of the mobile terminal).

Receiving the notification from the first network may include receiving a new first parameter from the first network.

The first network may be a 3GPP compliant cellular wireless communication network and at least one other network may be a WLAN.

In accordance with another aspect of the present disclosure, a method of operating a network device in a first wireless communication network for network interworking is provided. The method includes transmitting a first parameter indicating a preference of the first network for offloading a new or current data flow to another network, the first parameter comprising a value within a first range, and receiving from a mobile terminal a determination of whether to initiate or maintain at least one data flow between the mobile terminal and the first network or another network according to the first parameter and a random or pseudorandom value within a second range that at least partially overlaps the first range.

In accordance with another aspect of the present disclosure, a mobile terminal for network interworking is provided. The mobile terminal is configured to receive a first parameter from a first wireless communication network indicating a preference for offloading a new or current data flow to another network, the first parameter comprising a value within a first range, to obtain a random or pseudorandom value within a second range that at least partially overlaps the first range, and to determine whether to initiate or maintain at least one data flow between the mobile terminal and the first network or another network according to the first parameter and the random or pseudorandom value.

In accordance with another aspect of the present disclosure, a network device in a first wireless communication network for network interworking is provided. The network device is configured to transmit a first parameter indicating a preference of the first network for offloading a new or current data flow to another network, the first parameter comprising a value within a first range, and to receive from a mobile terminal a determination of whether to initiate or maintain at least one data flow between the mobile terminal and the first network or another network according to the first parameter and a random or pseudorandom value within a second range that at least partially overlaps the first range.

In accordance with another aspect of the present disclosure, a communication system for network interworking is provided. The communication system includes a first wireless communication network including a network device, another network, and a mobile terminal, wherein the mobile terminal is configured to receive a first parameter from the network device indicating a preference of the first network for offloading a new or current data flow to another network, the first parameter comprising a value within a first range, to obtain a random or pseudorandom value within a second range that at least partially overlaps the first range, and to determine whether to initiate or maintain at least one data flow between the mobile terminal and the first network or another network according to the first parameter and the random or pseudorandom value, wherein the network device is configured to transmit a first parameter indicating a preference of the first network for offloading new or current data flows to another network, the first parameter comprising a value within a first range, and to receive from a mobile terminal a determination of whether to initiate or maintain at least one data flow between the mobile terminal and the first network or another network according to the first parameter and a random or pseudorandom value within a second range that at least partially overlaps the first range.

In accordance with another aspect of the present disclosure, a computer program is provided. The computer program includes instructions arranged, when executed, to implement a method and/or apparatus in accordance with any one of the above-described aspects. A further aspect provides machine-readable storage storing such a program.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
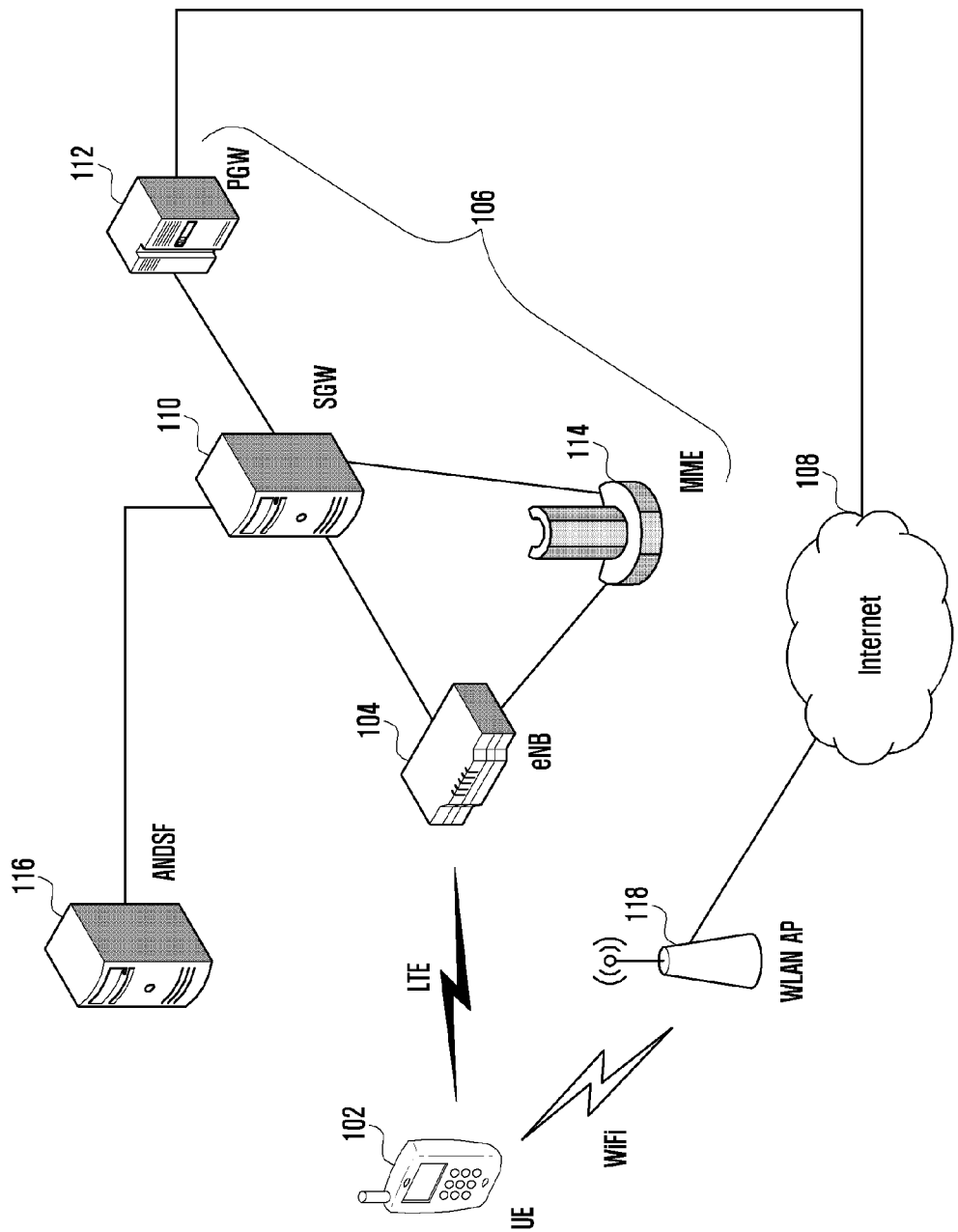
FIG. 1 schematically illustrates a system architecture suitable for interworking between a 3rd Generation Partnership Project (3GPP) compliant network and a Wireless Local Area Network (WLAN) network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The 3rd Generation Partnership Project (3GPP) study group RAN2 has identified a series of requirements for optimal interworking and load balancing between 3GPP and Wireless Local Area Network (WLAN) (though the skilled person will readily understand that similar requirements will apply to other types of networks). These include the need to be compatible with existing integration approaches that have already been deployed (for instance, trusted and non-trusted WLAN connections through the Evolved Packet Core (EPC), non-seamless WLANs connected directly to Internet and Multiple-Access Packet Data Network Connectivity (MAPCON)). Additionally, it is desirable to maintain backwards compatibility such that all legacy User Equipments (UEs) still work with both networks even though they may not directly benefit from the enhancements. As part of this, changes to the WLAN radio interface should be avoided (this also being necessary due to the widespread existing deployment of WLANs and the inability of 3GPP to directly influence the WLAN standards). Similarly, it is not desirable to base interworking and load balancing solutions on an interface between the 3GPP Universal Terrestrial Radio Access Network (UTRAN) and WLAN.

Interworking between a 3GPP network and a WLAN network can be viewed at a high level as comprising either network-controlled load balancing or network-assisted load balancing. Network-controlled load balancing requires each network access entity (the evolved Node B (eNB) or the Access Point (AP)) to decide whether a UE needs to be offloaded from its respective network according to load information from both networks. Network-assisted load balancing requires each network access entity to provide its own load information, and the UE determines whether to perform offloading based on UE implementation or network operator policies (for instance, provided by an Access Network Discovery and Selection Function (ANDSF) server).

In a network-controlled load balancing scenario, each network access entity requires knowledge of the load information for both networks. It has already been noted above that a direct interface between the networks is not desired, which leaves open the option of another entity (the UE) collecting and providing this information. The UE may collect WLAN load information by receiving beacon packets from the AP and provide this to the eNB. This load information already forms part of the WLAN standards, for instance channel utilization (percentage of the time that an AP senses that the medium is busy) transmitted in a beacon frame or a probe response frame through a Basic Service Set (BSS) load information element. However, for the UE to supply 3GPP load information to the WLAN AP would require a new message or information element to be introduced into the WLAN standards. A further problem with network-controlled load balancing is that if the UE user turns off a WLAN module this must be reported to the eNB to prevent inappropriate instructions to offload to a WLAN. This additional status reporting could be a burden to both the UE and the eNB.

Figure 2:
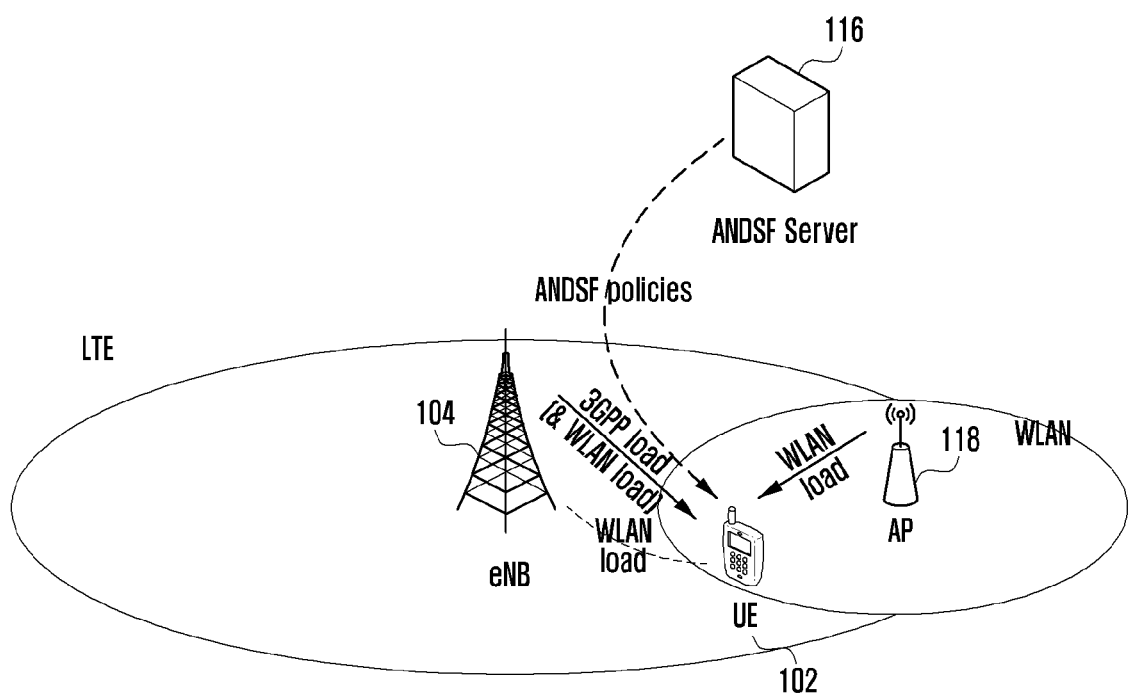
FIG. 2 schematically illustrates network-assisted load balancing between a 3GPP compliant network and a WLAN network according to an embodiment of the present disclosure.

FIG. 2 schematically illustrates network-assisted load balancing between a 3GPP compliant network and a WLAN network according to an embodiment of the present disclosure.

Referring to FIG. 2, a network-assisted load balancing scenario is schematically illustrated. The UE 102 obtains 3GPP load information and WLAN load information from the eNB 104 and the AP 118 respectively. Alternatively, or additionally, the eNB 104 may provide WLAN load information it has separately obtained. The 3GPP load information could be in various forms. For example, the eNB 104 may provide a measurement of a level of congestion (for instance, low, medium, high, or a percentage). This approach gives the explicit load status of the 3GPP network to UEs 102. However, operators may not want to reveal the instantaneous load status of their 3GPP network. As an alternative, the eNB 104 may provide an indicator which gives a preference for offloading data traffic to another network (for instance, an integer in the range 0 to 9). This is referred to as a Cellular Offload Preference Indicator (COPI). A single COPI is broadcast by the eNB 104 to all UEs 102 in that cell. Through the use of the COPI the eNB 104 indicates to UEs 102 a relative degree of how much the 3GPP network wants to offload UEs to the WLAN. It will be apparent to the skilled person that network-assisted load balancing meets the requirements identified by the 3GPP RAN2 study group listed above. Various embodiments of the present disclosure are based upon network-assisted load balancing.

After receiving the load information of the 3GPP network (either explicit load information or the implicit load information of the COPI) and optionally of the WLAN, the UE 102 selects the most suitable network. This selection may be based on policies stored at the UE 102. The policies can be pre-configured in the UE 102 or can be received from the ANDSF server if an ANDSF is utilized in the network. One such policy may be: if COPI is greater than x, and WLAN AP load is less than y, then move data flow to WLAN, if 3GPP load is less than x', and WLAN AP load is greater than y', then move data flow back to 3GPP network. As a further option, a UE may be provided with multiple different threshold values for different types of traffic, or even per IP flow. Furthermore, different UEs may have different threshold values. It will be understood that by configuring different thresholds in this way, changing a COPI value broadcast by the eNB 102 may result in offloading to a WLAN of lower priority IP flows (for instance, IP flows having lower quality of service requirements) first. It will be appreciated that such an approach necessarily requires the classification to be determined and maintained in such a way that offloading is fair for all UEs, and may require a large number of thresholds, and/or frequently revised thresholds. The alternative is that the same UEs or IP flows will always be offloaded first.

A problem arising from the basic offloading technique described above using a COPI is that it cannot be predicted readily what will be the precise impact of an increase in the COPI value. Specifically, because each UE receives the same COPI value and the same WLAN load indications, a small increase in the COPI value may result in the offloading of a large portion of the data traffic from the cellular network. This is exacerbated if the thresholds assigned to a large number of the UEs or individual IP flows are similar. Conversely, while this problem can be reduced by configuring different thresholds, as discussed above this can be a complex management task if it is to avoid unfairly offloading the same UEs each time. It is undesirable to constrain the setting of thresholds in this way.

In accordance with various embodiments of the present disclosure, a persistence based offload mechanism is proposed in which a degree of randomization is introduced into the offloading decision to reduce the probability of large numbers of UEs offloading IP flows due to a small change in the COPI value.

In accordance with various embodiments of the present disclosure, in a system having first and second wireless communication networks, the persistence mechanism comprises a UE receiving a first parameter from a first network and forming an offloading decision taking into account the first parameter and a random or pseudorandom number. The decision of whether to offload an IP flow in some embodiments is based upon the result of a comparison between a first parameter (or a function of the first parameter) and the random or pseudorandom number. In one embodiment, the decision of whether to offload an IP flow to a second network, or to initiate a new IP flow to the second network in preference to the first network is based upon a first parameter received from the first network only. In particular embodiments of the disclosure, the first parameter may be received from a cellular network, for instance a 3GPP cellular network and the UE may be configured to determine whether to offload an IP flow to a WLAN network (or in the reverse direction) based only on the first parameter. It will be understood, however, that the reverse situation may be true and the UE may be arranged to determine whether to offload an IP flow from a WLAN network to a cellular network on the basis of a first parameter received from the WLAN network.

In accordance with one embodiment, the first parameter may provide an indication of the preference of the first network for offloading new or current data flows to the second network. Specifically, for an embodiment in which the first network is a 3GPP cellular network, the first parameter may be the COPI value described above. Equally, the first parameter may be an indication of the network load of the first network (a higher network load implicitly indicating an increased preference for offloading data flows to reduce network load). The COPI value may be considered to be a persistence value as the tendency of a UE to persist with using a particular network for a data flow is dependent upon the COPI value.

Taking the example of the first parameter comprising a 3GPP COPI value, the COPI value may have a value within a first range. For instance, the first value may be an integer between 0 and 9, with a higher integer indicating a greater preference for offloading data flows (including initiating new data flows with the second network instead). The UE may be arranged to generate the random or pseudorandom number, or may obtain the random or pseudorandom number from another entity or have previously stored random or pseudorandom numbers for future use. The random or pseudorandom number may comprise a value within the same range as the COPI value, or the ranges may partially overlap. For instance, the random or pseudorandom number may comprise an integer between 0 and 9. Comparison of the random or pseudorandom number with the COPI value comprises determining if the random or pseudorandom number is less than, equal to or greater than the first parameter. The offloading decision may be based upon the result of the comparison, for instance by the UE determining to initiate a new data flow between the mobile terminal and another network according to the result of the comparison (the new data flow being to accommodate an existing data flow switched from the first network or a new data flow preferentially set up to the other network). As only one example, where a higher COPI value indicates a greater preference for offloading data flows from the first network, the decision may be to offload a data flow from a UE if the random or pseudorandom number is less than the COPI value. It will be understood that over a large group of UEs, through use of this randomizing process an increase in the COPI value will result in a greater proportion of data flows being offloaded, though for any single UE the offloading decision could result in either outcome.

In accordance with certain embodiments of the present disclosure, the UE may also receive network load information from the second network, and compare that network load to a threshold as described above. Specifically, the decision of whether to offload a data flow to a second network from a first network may be taken if the random or pseudorandom number is less than the first network COPI value and if the second network load parameter is less than a threshold. The decision of whether to offload a data flow from the second network to the first network may be taken if the random or pseudorandom number is greater than the first network COPI value and if the second network load parameter is greater than a threshold. The threshold may be provided from the Long Term Evolution (LTE) network as part of an offloading policy, for instance a policy received from an ANDSF server.

It will be understood that in the preceding example the decision of whether to offload a data flow is taken only if a criteria relating to both networks is fulfilled. As a further alternative, the offloading decision may be taken if only one criterion is fulfilled. For instance, the decision of whether to offload a data flow to a second network from a first network may be taken if the random or pseudorandom number is less than the first network COPI value or if the second network load parameter is less than a threshold. The decision of whether to offload a data flow from the second network to the first network may be taken if the random or pseudorandom number is greater than the first network COPI value or if the second network load parameter is greater than a threshold.

Further alternatives will be readily apparent to the appropriately skilled person based upon at least the comparison of one parameter received from one network with a random or pseudorandom number.

In accordance with certain embodiments of the present disclosure, while a single COPI value may be transmitted, individual UEs may modify the COPI value according to a scaling factor or an offset. The scaling factor or offset comprises a second parameter received by each UE from the cellular network. It will be appreciated that the second parameter may take other forms, such that the COPI value is modified differently from applying a scaling factor or an offset. The second parameter allows the random or pseudorandom number to be compared to a function of the COPI value. The second parameter may be specific to each UE, or to groups of UEs. Furthermore, each UE may have more than one scaling factor or offset for use with different types of data flows (for instance different priority data flows). This allows a policy to be set (for instance by the ANDSF server) supporting different offload preferences for different types of UEs (for instance, higher offloading preference for roamers) and/or for certain types of traffic (for instance, higher offloading preference for traffic with lower quality of service requirements by providing multiple scaling factors or offsets to each UE). The configuration of scaling factors or offsets may be controlled by an ANDSF server. Evaluation of an offloading criterion relating to a load indication from the other network may be performed as before, while in some embodiments of the present disclosure the UE may evaluate the offloading criterion related to the network load by drawing a random number within a defined/specified range (RAND), and considering the network overload criterion to be fulfilled according to one of the following cases:

RAND<COPI*scaling factor (case a) OR
RAND<COPI+Off (case b)

It will be appreciated that in an alternative embodiment the second parameter may be applied by the UE to the random or pseudorandom number instead of to the COPI value. That is, the COPI value may be compared to a function of the random or pseudorandom number. In an alternative embodiment of the present disclosure, in place of, or in addition to, the use of a second parameter such as a scaling factor or offset to apply the first network offloading criterion differently for different UEs and/or types of data, more than one COPI value may be transmitted by the first network. Specifically, a different COPI value may be set for specific UEs or groups of UEs. Additionally, or alternatively, different COPI values may be set for different types of data flows from a single UE. As a further alternative, separate second parameters such as scaling factors or offsets may be provided to each UE or groups of UEs such that IP flows from different UEs are treated differently, while at the same time separate COPI values are provided for treating different types of IP flows differently. Of course, the reverse may also be true in further various embodiments: separate COPI values may be provided for different types of UEs such that IP flows from different UEs are treated differently, while at the same time separate second parameters such as scaling factors or offsets are provided for treating different types of IP flows differently When evaluating the offloading criterion relating to the second network, the indication of network load from the second network may be considered to be a third parameter and the threshold may be considered to be a fourth parameter. In certain embodiments there may be more than one third parameter. Specifically, for the example of a WLAN second network there may be multiple kinds of third parameter indicating different aspects of the load of the WLAN network, for instance, channel utilization or station count. It will be understood that different UEs may use different third parameters (different indications of second network load) to evaluate the second network offloading criterion. Alternatively, or additionally, a single UE may evaluate the second network offloading criterion using different third parameters for different types of data flow. Furthermore, the fourth parameter (the threshold) may be configurable, and may be sent to the UEs (or different values sent to different UEs) as part of a system offloading policy.

The skilled person will further realize that the evaluation of the second network offloading criterion may be performed in a similar manner to the evaluation of the first network offloading criterion in certain embodiments of the present disclosure. Specifically, evaluating the second network offloading criterion may comprise comparing a random or pseudorandom number or a function of a random or pseudorandom number to the second network load indication or a function of the second network load indication. The function of a random or pseudorandom number and/or a function of the second network load indication may comprise the use of a scaling factor or offset, as for the first network offloading criterion.

In accordance with certain embodiments of the present disclosure, the evaluation of network overloading criteria may be performed upon establishing a new IP flow. Alternatively, or additionally, the evaluation may be performed upon detecting the need to re-evaluate the WLAN offloading check. The need to perform a re-evaluation may be detected in one embodiment by receiving a notification that the first network load should be re-evaluated. This notification may be achieved for a 3GPP network by reusing the existing indication of a system information change, which may be provided also when the broadcasted COPI value has changed. It will be understood that this approach implies that the UE performs the re-evaluation also in case of other system information changes, though typically such system information changes occur infrequently so this approach may result in an acceptable level of unnecessary re-evaluations.

When performing a re-evaluation upon receiving a notification, especially if this concerns the indication of a system information change (notification or value tag change), many UEs may simultaneously perform the re-evaluation. As a result, many UEs may simultaneously decide to move IP flows from one network to another. Moving an IP flow to another network may involve some signaling, for instance the establishment of a radio connection. Therefore, simultaneous re-evaluation could result in signaling peaks. To combat this, according to certain embodiments of the present disclosure, a dispersion mechanism is provided. Upon receiving a notification that the first network load should be re-evaluated, each UE may apply a delay before generating any signaling resulting from the re-evaluation. The delay applied by the UE is randomly selected within a range that may either be fixed or configurable. In certain embodiments of the present disclosure, a configurable range that may be set by a network operator is desirable due to the impractically of standardizing a range. Additionally, the level of dispersion of the signaling load generated by a large number of UEs simultaneously performing a re-evaluation is increased by providing a longer range, but at the cost of increased average delay when re-evaluating the network to use. Network operators can configure the range to suit their specific requirements.

In accordance with certain embodiments of the present disclosure, the re-evaluation process may be performed periodically. This may be in addition to or as an alternative to the re-evaluation upon network notification described above. This is desirable because WLAN load parameters (e.g. channel utilization, station count, etc.) may change rapidly without notification in advance to the UE. In one embodiment, upon establishment of a new IP flow, a UE may start a periodic timer. When the timer expires, the UE restarts the timer and performs the WLAN offloading check. It will be appreciated that because there is no coordination between UEs regarding when they initiate data flows, there is a reduced probability of a large number of UEs performing a periodic offloading re-evaluation simultaneously. Consequently, the likelihood of a peak in the signaling load in response to periodic re-evaluation is reduced compared with re-evaluation upon notification. Therefore, in some embodiments there is no need to perform the same dispersion procedure by calculating a random delay, though of course in other embodiments the randomized delay may be applied to periodic re-evaluation.

According to certain embodiments of the present disclosure described above, the UE regularly re-evaluates for each applicable IP flow whether the offloading status should be changed (that is, whether the IP flow should be offloaded to the WLAN network or returned to the LTE network). This may either be performed periodically (which advantageously allows WLAN changes to be incorporated into the re-evaluation) or upon a change of the parameters (particularly the COPI value). However, the various embodiments of the present disclosure described above do not include any mechanism to preferentially keep IP flows on the existing network (LTE or WLAN). If the COPI value is set to 50% of its maximum value (and the WLAN network is not overloaded), this means that at every re-evaluation, 50% of the UEs will change network (with some UEs changing in each direction). It may be that the same result could have been achieved without moving a single IP flow. It will be appreciated that this may be inefficient. In accordance with a further embodiment of the present disclosure, the re-evaluation may be applied only for changes in network in a first direction (that is, from LTE to WLAN or from WLAN to LTE). This may be achieved by re-evaluating the offload criteria only for IP flows between UEs and one or other of the networks. For example, should the LTE network require 10% of the IP flows that are currently between UEs and the LTE network to be offloaded, then the LTE network may transmit an "offload" direction indicator and a COPI value set to an appropriate value. For a simple scenario in which the re-evaluation takes account of only the COPI value and not the loading of the WLAN network (and without using scaling factors or offsets), the COPI value may be set to 10% of its range, assuming the range of the random or pseudorandom number is the same. The re-evaluation is then only performed by UEs which currently have IP flows between the UE and the LTE network. Alternatively, should the LTE network require a proportion of offloaded IP flows to return to the LTE network, then the LTE network may transmit a "return" direction indicator and an appropriate COPI value. The re-evaluation is then only performed by UEs which currently have IP flows offloaded to the WLAN. The offload direction indicator may comprise a selection of a network such that the re-evaluation is only performed by UEs for data flows connected to the selected network. In certain embodiments where an offload direction indicator is provided, other parameters may be provided separately for each direction. In particular, the second parameter (the scaling factor or the offset) may be different for each direction. The third parameter (WLAN loading threshold) may also be different for each direction. As a further alternative, in preference to sending different parameters for use in each direction, a parameter or a single set of parameters may be transmitted to the mobile terminal for use in a first direction, and the mobile terminal may be arranged to derive a modified parameter or set of parameters for use in the opposite direction.

In certain embodiments, multiple values of the first parameter (the COPI value) and/or the second parameter (the scaling factor or the offset) may be provided, each applicable for different values of the third parameter (WLAN loading threshold). This makes it possible to configure the percentage of traffic to be offloaded from the LTE network to the WLAN dependent on the load of the WLAN. These multiple first and second parameters according to the third parameters may be provided and used regardless of whether an offload direction indicator is also used.

Figure 3:
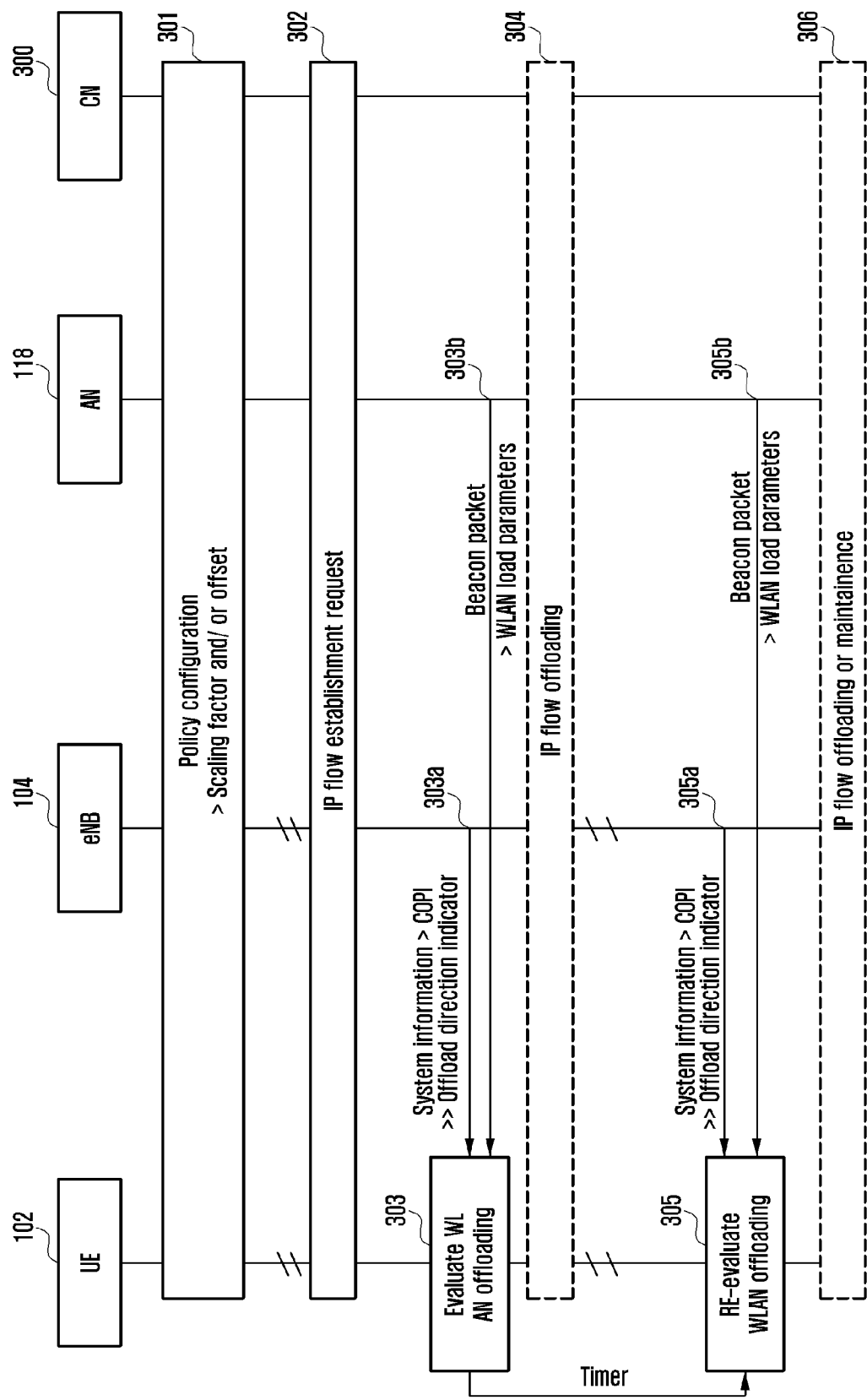
FIG. 3 illustrates offload evaluation for interworking between a 3GPP compliant network and a WLAN network in accordance with an embodiment of the present disclosure.

FIG. 3 illustrates offload evaluation for interworking between a 3GPP compliant network and a WLAN network in accordance with an embodiment of the present disclosure.

Referring to FIG. 3, a process of evaluating whether a new IP data flow should be established with a first network or a second network is schematically illustrated. The first network comprises a 3GPP compliant cellular network and the second network comprises a WLAN. Signaling between different components is illustrated. Specifically, signaling between a UE 102, a 3GPP network eNB 104, a WLAN AP 118 and a Core Network (CN) 300 is illustrated. The CN comprises a network or a server with which the UE 102 desires to establish an IP data flow. FIG. 3 illustrates the basic message sequence covering acquisition of the system information including the E-UTRAN COPI (which implicitly provides an indication of network load), performance of a WLAN offloading evaluation upon establishing the IP flow and subsequent re-evaluation of the WLAN offloading.

At operation 301, before the UE has begun establishing the new IP data flow, the UE 102 is configured with a WLAN offloading policy. The policy may include one or more UE 102 specific scaling factors and/or one or more UE specific offsets. As discussed above different scaling factors or offsets may be established for different UEs 102 and/or for different traffic types or IP flows. For instance, a different scaling factor or offset may be applicable according to a quality of service class of the IP flow.

At operation 302, an IP flow establishment request is transmitted either from the UE 102 or from the CN 300. The IP flow establishment request may be transmitted using a current or a default network. In other various embodiments of the present disclosure it may be that the offloading evaluation is performed before any IP flow establishment request is transmitted.

At operation 303, the UE 102 performs the WLAN offloading evaluation. The evaluation may include obtaining system information including the COPI value and in some embodiments an offload direction indicator from the eNB 104 at operation 303a, if the UE 102 is not already in possession of a valid version of these parameters. In certain embodiments of the present disclosure, at operation 303b the evaluation may include obtaining system information through a beacon packet including a WLAN load parameter from the AP 118. The UE 102 detects that system information parameters have changed by monitoring Paging from the eNB 104 or by checking a value tag. If the UE 102 is unable to receive paging it needs to check the value tag to confirm that existing system information is still valid. If the UE 102 cannot confirm this within a period, for instance of 3 hours, the UE considers the existing system information parameters to be out of date. Similarly, the UE 102 may already possess of a WLAN load parameter received from a previous beacon packet.

At operation 303, the UE 102 evaluates the WLAN offloading policy, using the actual EUTRAN (COPI) and WLAN load information by comparing the random or pseudorandom selected number either to the COPI value or to a function of the COPI value taking account of an appropriate scaling factor or offset (and the offload direction indicator if one has been provided). In certain embodiments, the evaluation may also comprise comparison of the WLAN load value with a threshold. The result of the evaluation of the WLAN offloading policy is a determination either to offload the IP flow to the WLAN or to map the IP flow to an E-UTRAN bearer.

After the initial evaluation is complete the UE 102 begins a periodic WLAN offloading re-evaluation timer.

At operation 304, depending on the outcome of the WLAN offloading evaluation, the UE 102 may initiate offloading of the IP flow to the WLAN.

At operation 305, upon expiry of the periodic WLAN offloading re-evaluation timer, the UE 102 re-evaluates the WLAN offloading using the same procedure as upon initial IP flow establishment. This re-evaluation may again require new system information to be obtained at operations 305a and 305b. As a result of the re-evaluation an IP flow may be switched from the 3GPP cellular network to the WLAN or vice versa, or the current IP flow may be maintained at operation 306.

Figure 4:
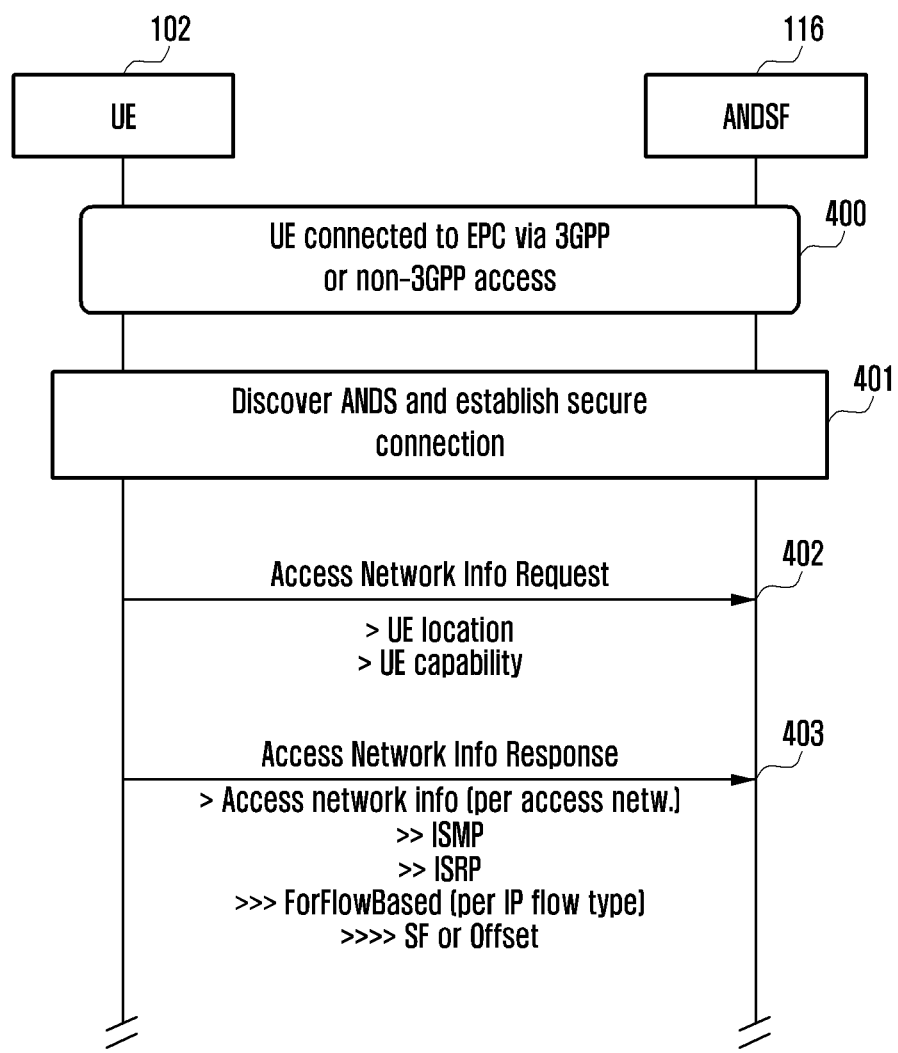
FIG. 4 illustrates Access Network Discovery and Selection Function (ANDSF) policy retrieval in accordance with an embodiment of the present disclosure.

FIG. 4 illustrates ANDSF policy retrieval in accordance with an embodiment of the present disclosure.

FIG. 4 expands upon the policy configuration operation 301 of FIG. 3, and identifies messages transmitted between the UE 102 and an ANDSF server 116 within the CN 300. It will be appreciated by the skilled person that the policy configuration illustrated in FIG. 4 is merely exemplary, and policies may be disseminated to UEs in other ways that may or may not make use of an ANDSF server. The policy configuration may be implemented by appropriate modifications to and ANDSF Management Object (MO) as defined by TS 24.312, "Access Discovery and Selection Function (ANDSF) Management Object (MO)", and may be compatible with the OMA DM protocol specification.

FIG. 4 begins at state 400 in which the UE 102 is connected to the EPC 106 via the 3GPP network or via a non-3GPP network (for instance the WLAN network).

At operation 401, the UE 102 and the ANDSF server 116 discover one another and establish a secure connection.

At operation 402, the UE 102 initiates retrieval of a WLAN offloading policy. The request may include the UE's current location (by including e.g. PLMN, TAC, cell identity or RPLMN) as well as the UEs capabilities (in this case whether or not it supports persistence based WLAN offloading).

At operation 403 the ANDSF server 116 provides the WLAN offloading policy (ISMP, ISRP including ForFlow-Based, including extensions for load based WLAN offload). This policy may include multiple rules, with different priorities. In accordance with the present disclosure, the WLAN offloading policy may further include one or more scaling factors and/or one or more offsets. The UE 102 applies the highest priority rule, potentially limited to the set of rules supported by the network nodes to which the UE is connected.

Figure 5:
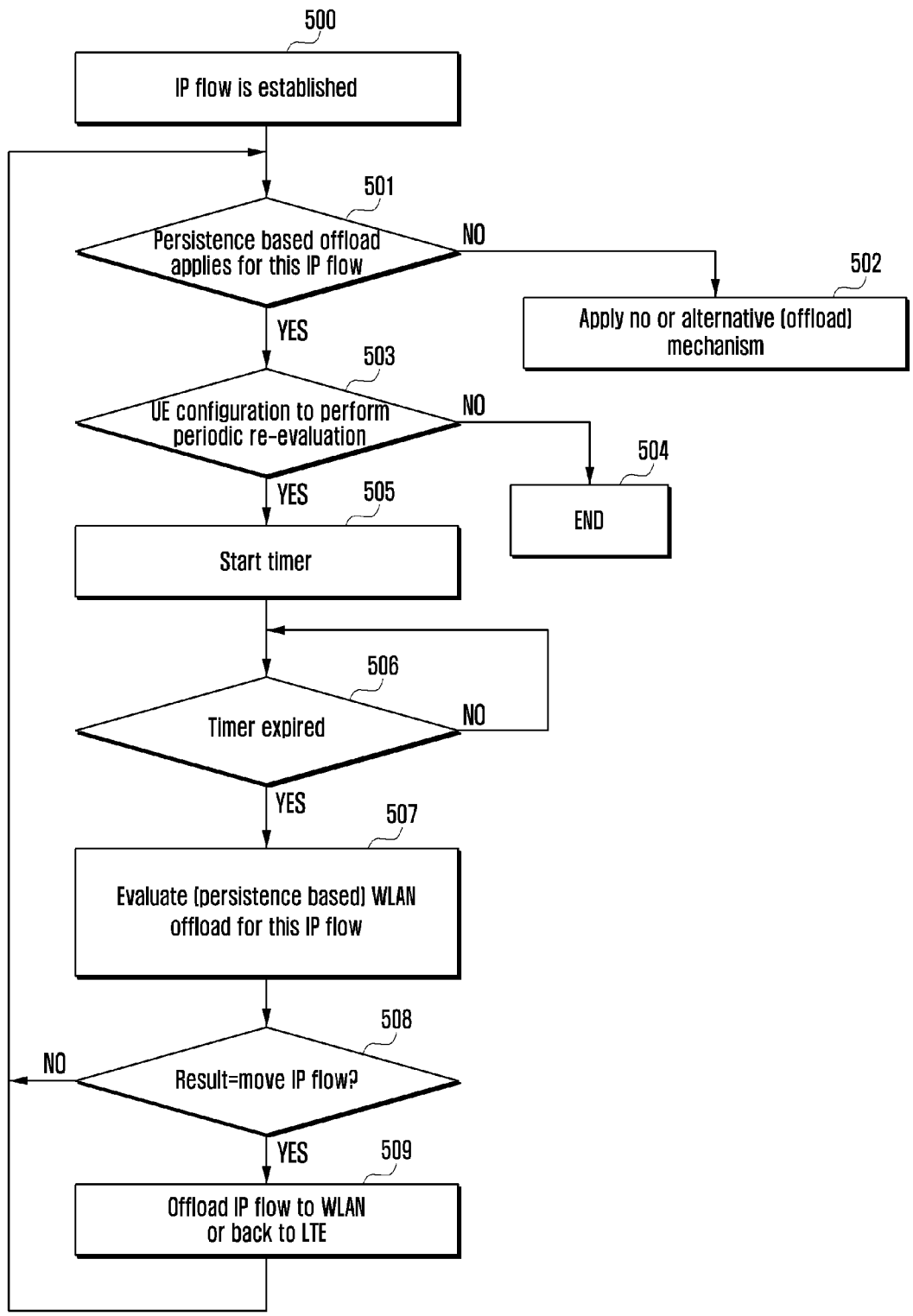
FIG. 5 is a flowchart of interworking operations performed at a User Equipment (UE) in accordance with an embodiment of the present disclosure.

FIG. 5 is a flowchart of interworking operations performed at a UE in accordance with an embodiment of the present disclosure.

Referring to FIG. 5, this illustrates a flowchart of a method indicating the modified behavior allowing periodic re-evaluation of the WLAN offloading performed at the UE.

At operation 500, the IP flow is established as described above in connection with FIG. 3. At operation 501, a determination is made whether the UE is configured to perform persistence based offloading of the IP flow using a COPI value and a random or pseudorandom number. If the UE is not so configured, then at operation 502, the UE may apply an alternative offloading mechanism or no offloading mechanism for that IP flow. Alternatively, at operation 503, a determination is made of whether the UE is configured to perform periodic re-evaluation of the offloading criteria. If the UE is not so configured, then the process ends at operation 504. Alternatively, if the UE is configured to perform periodic re-evaluation, then at operation 505, a re-evaluation timer is started. At operation 506, a check is made of whether the timer has expired, and when the timer has expired at operation 507, the WLAN offloading is re-evaluated as described above. At operation 508, as a result of the re-evaluation, a determination is made of whether an IP flow requires offloading to the WLAN or back to the 3GPP network. If the determination is that a switch is required, then at operation 509, either the IP flow is offloaded to the WLAN or the IP flow is moved back to the LTE network and the process returns to operation 501. Alternatively, if at operation 508 the determination is made that a switch is not required, the process returns immediately to operation 501.

Figure 6:
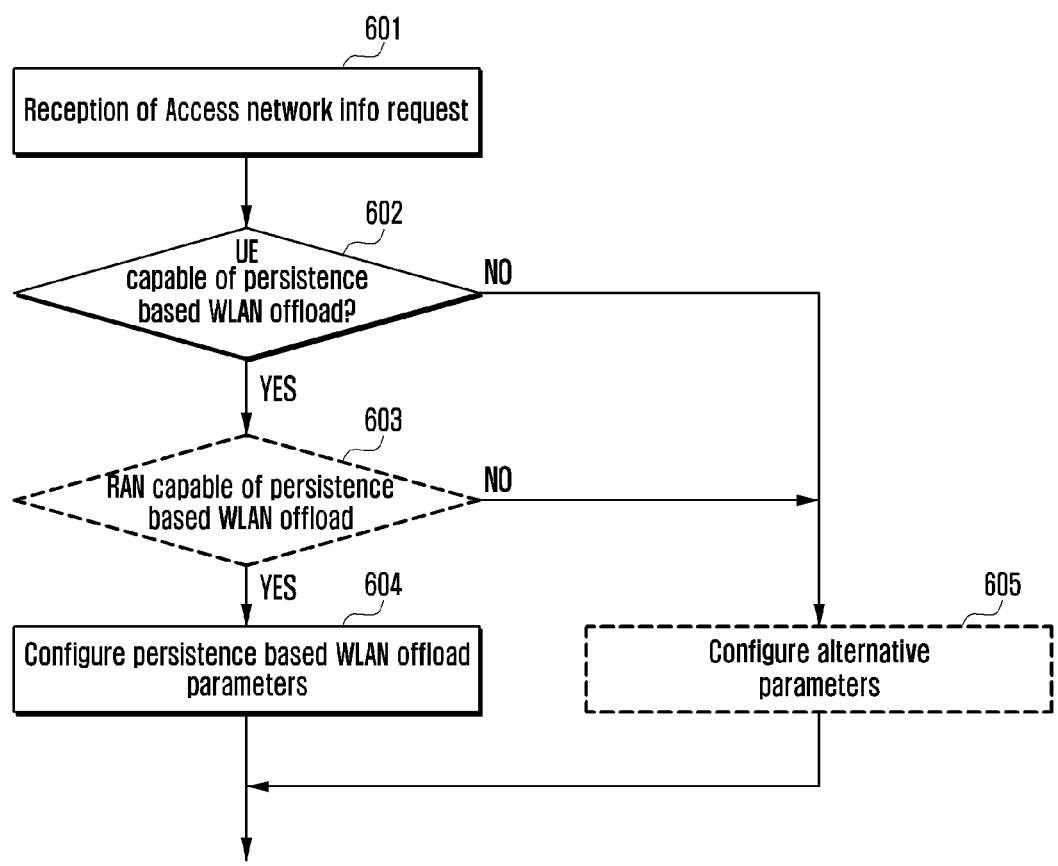
FIG. 6 is a flowchart of a network operation for WLAN interworking in accordance with an embodiment of the present disclosure.

FIG. 6 is a flowchart of a network operation for WLAN interworking in accordance with an embodiment of the present disclosure.

Referring to FIG. 6, this illustrates a flowchart of the modified behavior of an ANDSF server upon policy configuration. At operation 601, the ANDSF server receives an access network information request. At operation 602, a determination is made of whether the UE is capable of persistence based WLAN offloading. If the determination is that the UE is not so capable, then at operation 605, an alternative parameter set is configured. Otherwise, at operation 603, a determination is made of whether the 3GPP RAN is capable of persistence based WLAN offloading. This additional determination may be required if, in a 3GPP network supporting persistence based WLAN offloading, not all eNBs support this functionality. If the RAN is not so capable, then the alternative parameter set is configured at operation 605. Otherwise, the ANDSF server configures a persistence based WLAN offload parameter set and communicates this to the UE. If the UE moves into or out of an area supporting persistence based policy, the UE may requests an update of the policy set for that UE.

Various embodiments of the present disclosure described above include a first network providing a parameter indicating a preference for offloading new or current data flows to another network. In specific embodiments, the first parameter comprises the COPI value. However, it will be appreciated that in alternative embodiments, the first network may provide a parameter providing a measure or indication of the load of the first network, either an instantaneous load, an average load, or some other indication of load. The skilled person will appreciate that where the first network provides only an indication of load to the UE, then this is implicitly an indication of a preference for offloading new or current data flows to another network. That is, an increased load is equivalent to an increased preference for offloading new or current data flows on the grounds that this minimizes the risk of overloading the first network.

It will be appreciated that various embodiments of the present disclosure can be realized in the form of hardware, software or a combination of hardware and software. Any such software may be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk, magnetic tape, or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The present disclosure is not restricted to the details of any foregoing embodiments. The present disclosure extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

While the present disclosure has been shown and described with reference to various embodiments thereof, it will be understood by those skilled in the art that various changes in form and details may be made therein without departing from the spirit and scope of the present disclosure, as defined by the appended claims and their equivalents.

What is claimed is:

1. A method of operating a mobile terminal for network interworking, the method comprising:
   receiving, from a first network, a first parameter associated with a preference for offloading a data flow from the first network to a second network;

receiving, from the second network, a second parameter associated with a network load level of the second network through a beacon packet;

performing a first determination of whether to offload at least one data flow according to a first criterion of comparing the first parameter to a random value or a pseudorandom value and a second criterion of comparing the second parameter to a threshold; and if a timer associated with offloading evaluation expires, performing a second determination of whether to maintain the offloading of the at least one data flow according to the first and second criterion using a third parameter associated with a preference for offloading a data flow from the first network to the second network, and a fourth parameter associated with a network load level of the second network, wherein the third parameter corresponding to the first parameter is received from the first network after receiving the first parameter, and wherein the fourth parameter corresponding to the second parameter is received from the second network after receiving the second parameter.

2. The method according to claim 1, wherein the performing of the first determination comprises evaluating the first criterion by comparing a random or pseudorandom number or a function of the random or pseudorandom number to the first parameter or a function of the first parameter.

3. The method according to claim 2, further comprising:
receiving at least one fifth parameter comprising a scaling factor or an offset; and
applying the at least one fifth parameter to the random or pseudorandom number to calculate the function of the random or pseudorandom number, or applying the at least one fifth parameter to the first parameter to calculate the function of the first parameter.

4. The method according to claim 3, further comprising:
receiving multiple fifth parameters at the mobile terminal; and
determining which one of the multiple fifth parameters to use to calculate the function of the random or pseudorandom number or the first parameter according to a classification of the at least one data flow to be initiated or maintained.

5. The method according to claim 2, wherein the evaluating of the first criterion comprises determining whether:
the random or pseudorandom number or the function of the random or pseudorandom number is less than the first parameter or the function of the first parameter;
the random or pseudorandom number or the function of the random or pseudorandom number is less than or equal to the first parameter or the function of the first parameter;
the random or pseudorandom number or the function of the random or pseudorandom number is greater than the first parameter or the function of the first parameter; or
the random or pseudorandom number or the function of the random or pseudorandom number is greater than or equal to the first parameter or the function of the first parameter.

6. The method according to claim 2, further comprising:
evaluating the second criterion by comparing the second parameter or a function of the second parameter to the threshold or a function of the threshold; and
determining whether to initiate or maintain the at least one data flow between the mobile terminal and the first network or the second network according to the evaluation of the first and second criterion.

7. The method according to claim 1, wherein the performing of the first determination comprises:
performing a determination of whether to initiate a new data flow when it is determined that a new data flow is required;
performing a determination of whether to initiate or maintain the at least one data flow in response to receiving a notification from the first network; or
performing the determination of whether to initiate or maintain the at least one data flow periodically.

8. The method according to claim 7, wherein the performing of the determination of whether to initiate or maintain the at least one data flow in response to the receiving of a notification from the first network or periodically comprises:
receiving an offload direction indicator from the first network indicating either the first network or another network;
identifying at least one data flow between the UE and the indicated first network or another network; and
performing the determination of whether to initiate or maintain the at least one data flow for the at least one identified data flow.

9. The method according to claim 7, wherein the performing of the determination to initiate or maintain the at least one data flow in response to receiving a notification from the first network further comprises applying a randomly selected first delay before performing the determination.

10. The method according to claim 7, wherein the receiving of the notification from the first network comprises receiving a new first parameter from the first network.

11. The method according to claim 1,
wherein the first network is a 3rd generation partnership project (3GPP) a compliant cellular wireless communication network, and
wherein the second network is a wireless local area network (WLAN).

12. A method of operating a network device in a first network for network interworking, the method comprising:
transmitting, to a mobile terminal, a first parameter associated with a preference of the first network for offloading a data flow from the first network to a second network; and
receiving, from the mobile terminal, a first determination of whether to offload at least one data flow according to a first criterion of comparing the first parameter to a random or pseudorandom value and a second criterion of comparing a second parameter to a threshold,
wherein the second parameter associated with a network load level of the second network is transmitted from the second network to the mobile terminal through a beacon packet,
wherein if a timer associated with offloading evaluation expires, a second determination of whether to maintain the offloading of the at least one data flow is performed by the mobile terminal according to the first and second criterion using a third parameter associated with a preference for offloading a data flow from the first network to the second network and a fourth parameter associated with a network load level of the second network,
wherein the third parameter corresponding to the first parameter is transmitted to the mobile terminal after transmitting the first parameter, and wherein the fourth parameter corresponding to the second parameter is transmitted from the second network to the mobile terminal after transmitting the second parameter.

13. A mobile terminal for network interworking, the mobile terminal comprising:
- a transceiver configured to transmit and receive a signal; and
- at least one processor configured to:
  - receive, from a first network, a first parameter associated with a preference for offloading a data flow from the first network to a second network,
  - receive, from the second network, a second parameter associated with a network load level of the second network through a beacon packet,
  - perform a first determination of whether to offload at least one data flow according to a first criterion of comparing the first parameter to a random value or a pseudorandom value and a second criterion of comparing the second parameter to a threshold, and
  - if a timer associated with offloading evaluation expires, perform a second determination of whether to maintain the offloading of the at least one data flow according to the first and second criterion using a third parameter associated with a preference for offloading a data flow from the first network to the second network and a fourth parameter associated with a network load level of the second network,
- wherein the third parameter corresponding to the first parameter is received from the first network after receiving the first parameter, and
- wherein the fourth parameter corresponding to the second parameter is received from the second network after receiving the second parameter.

14. A network device in a first network for network interworking, the network device comprising:
- a transceiver configured to transmit and receive a signal; and
- at least one processor configured to:
  - transmit, to a mobile terminal, a first parameter associated with a preference of the first network for offloading a data flow from the first network to a second network, and
  - receive, from the mobile terminal, a first determination of whether to offload at least one data flow according to a first criterion of comparing the first parameter to a random or pseudorandom value and a second criterion of comparing a second parameter to a threshold,
- wherein the second parameter associated with a network load level of the second network is transmitted from the second network to the mobile terminal through a beacon packet,
- wherein if a timer associated with offloading evaluation expires, a second determination of whether to maintain the offloading of the at least one data flow is performed by the mobile terminal according to the first and second criterion using a third parameter associated with a preference for offloading a data flow from the first network to the second network, and a fourth parameter associated with a network load level of the second network,
- wherein the third parameter corresponding to the first parameter is transmitted to the mobile terminal after transmitting the first parameter, and
- wherein the fourth parameter corresponding to the second parameter is transmitted from the second network to the mobile terminal after transmitting the second parameter.

* * * * *